Patented May 1, 1928.

1,668,239

UNITED STATES PATENT OFFICE.

GEORGE D. GRAVES, OF CASPER, WYOMING, ASSIGNOR TO STANDARD OIL COMPANY, OF WHITING, INDIANA, A CORPORATION OF INDIANA.

ART OF REMOVING WAX FROM OIL.

No Drawing.  Application filed July 27, 1925.  Serial No. 46,490.

The present invention relates to improvements in the removal of wax from oil, and more particularly from wax-containing viscous fractions derived by distillation under non-cracking conditions, particularly with fire and steam or under vacuum. It will be fully understood from the following description, in which an embodiment of the invention is set forth.

In the distillation of petroleum oils with fire and steam and under vacuum, and to a lesser extent in fire distillation, when conducted under non-cracking conditions, the wax distillate is found to contain wax of such a nature as to be difficult of separation by filter pressing, and the resulting wax can be sweated only with difficulty, if at all. The most common method of handling such distillates in oil refineries is by re-running, in which operation some decomposition takes place. The distillate from this re-running operation is found to be easily pressed and the resulting wax easily sweated. The decomposition occurring during the re-running operation, however, results in a large loss of viscous lubricant fractions, and the expense of the re-running operation is itself considerable. Other methods of handling such distillates have been proposed, such as diluting, chilling and centrifuging; diluting with wax-free oil and pressing; diluting with oils containing readily filtrable wax and the like.

In accordance with the present invention, wax is removed from wax distillate of the character above set forth in the following manner:

The wax distillate is brought by cooling or otherwise to a temperature of 70 to 90° F., (at least below its cloud point slightly above its cold test). At such temperatures certain wax constituents of the oil are found to crystallize out, and the oil is put through filter presses in the ordinary manner, and a cake of wax is found to build up, the wax being of a fairly dry, crumbly character. The proportion of wax thus removed of course varies with the type of oil employed; in the case of a wax distillate derived from a Wyoming crude oil it was found to be in the neighborhood of 2% on the oil pressed, the oil being a distillate of an average gravity of 30.5° A. P. I. derived from continuous fire and steam distillation. The wax thus obtained is of the character of "slop wax". Somewhat lower or higher temperatures may be employed; at higher temperatures some of the slop wax tends to remain in the oil and at lower temperatures a more perfect separation of the slop wax may be secured.

The pressed distillate contains the ordinary paraffin wax present in the oil, and may, according to the temperature employed in the first pressing operation, contain small amounts of slop wax insufficient to interfere with the pressing and sweating of the paraffin wax. The pressed distillate from the first pressing operation is then chilled and pressed as in ordinary methods of separating paraffin wax from wax distillate; thus, for certain types of oils, it may be chilled to 20° F. and filter-pressed in the usual manner. If lower cold test lubricants are desired from the wax distillate, the temperature to which it is chilled may be lower, or a second pressing operation may be carried out at lower temperature, as in ordinary practice.

The slop wax derived from the first pressing operation is of somewhat higher melting point than ordinary paraffin wax, its melting point being, on an average, from 138 to 140° F. On fractional crystallization, it is found to yield separable products having a melting point range from 125 to 158° F. In accordance with this invention, it is removed from the wax distillate at a temperature at which substantially all of the paraffin wax remains in solution. It may not be admixed with paraffin wax prior to sweating, as it seriously interferes with the sweating of oil from paraffin wax when present in amounts appreciably greater than from 2 to 3% of the paraffin wax.

Although the present invention has been described in connection with a specific method of carrying it into effect, it is not intended that the details hereinbefore set forth shall be regarded as limitations upon the scope of the claims except in so far as included in the accompanying claims.

I claim:

1. The method of removing waxes which hinder filtration or sweating of ordinary paraffin wax from oil distillates containing principally paraffin wax together with such waxes, comprising filter-pressing such oil at a temperature at which the paraffin wax remains in solution in the oil and below the temperature at which the first mentioned waxes are crystallized from the oil, thereby producing as a filtrate a filter-pressible paraffin wax-containing oil.

2. The method of removing slop wax from distillate oils containing principally paraffin wax together with slop wax, comprising filter-pressing such oils at temperatures of 70 to 90° F., thereby producing as a filtrate a filter-pressable paraffin wax-containing oil.

3. The method of removing wax from distillate oils containing principally paraffin wax together with slop wax comprising filter-pressing the oil at a temperature below its cloud point and above the temperature at which the paraffin wax remains in the oil, cooling the pressed distillate to a temperature at which the paraffin wax is crystallized out, and again filter-pressing the oil.

4. The method of removing wax from oil distillates containing slop wax principally paraffin wax together with slop wax which comprises filter-pressing the oil at a temperature of 70 to 90° F., subsequently chilling the pressed distillate to a temperature of not more than 20° F., and again filter-pressing said pressed distillate.

GEORGE D. GRAVES.